United States Patent Office 3,205,035
Patented Sept. 7, 1965

3,205,035
PROCESS FOR PRODUCING HIGH PURITY BERYLLIUM FLUORIDE
Simon J. Morana, Hazleton, Gordon F. Simons, Drums, and Arthur Epstein, Reading, Pa., and Robert Harry Ray, Idaho Falls, Idaho, assignors to The Beryllium Corporation, Reading, Pa., a corporation of Delaware
No Drawing. Filed Sept. 20, 1963, Ser. No. 311,280
4 Claims. (Cl. 23—88)

This application is a continuation-in-part of Ser. No. 295,292, filed July 12, 1963, now abandoned, which in turn is a continuation-in-part of Ser. No. 44,868, filed July 25, 1960, now abandoned.

This invention relates to a new and improved process of preparing a high purity beryllium fluoride.

According to the presently employed method of producing beryllium fluoride, four (4) mols of fluorine are required per one (1) mol of beryllium so that, as is demonstrated in the following outline of this present method, an excess of 100% of fluorine is consumed in obtaining the resultant crystalline end product, beryllium fluoride.

It is accordingly an object of the present invention to provide a new method by which it is possible to prepare high purity beryllium fluoride by the employment of as little as 20% excess of the theoretical amount of ammonium bifluoride required for carrying out the method or process heretofore used.

The method heretofore used for commercial production of high purity beryllium fluoride has been to prepare ammonium beryllium fluoride crystals $(NH_4)_2BeF_4$ and then decompose the crystals thermally to beryllium fluoride and ammonium fluoride. The ammonium beryllium fluoride is prepared by reacting beryllium hydroxide cake with an ammonium bifluoride solution. The contaminants in the ammonium beryllium fluoride solution are removed chemically and ammonium beryllium fluoride crystals are obtained from the purified solution by evaporation and crystallization. It is very important that the ammonium fluoride-beryllium fluoride ratio be held to the stoichiometric proportions for the crystallization of ammonium beryllium fluoride.

The chemical reactions involved in the procedure above described are as follows:

(1) $Be(OH)_2 + 2NH_4HF_2 \rightarrow (NH_4)_2BeF_4 + 2H_2O$ 

(2) $(NH_4)_2BeF_4 \rightarrow BeF_2 + 2NH_4F$ 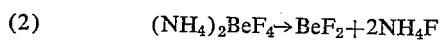

Consideration of the preceding equations will show that four (4) mols of fluorine are required per one (1) mol of beryllium in the preparation of ammonium beryllium fluoride. Thus, 100% excess fluorine is consumed in its prepartion, since there are only two (2) mols of fluorine per one (1) mol of beryllium in the end produce, beryllium fluoride.

The amount of ammonium bifluoride required theoretically to prepare beryllium fluoride from beryllium hydroxide is represented by the following chemical formula:

(3) $Be(OH)_2 + NH_4HF_2 \rightarrow BeF_2 + NH_3 + 2H_2O$ 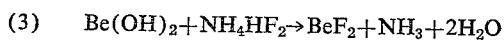

The herein disclosed new process will show that it is possible to prepare beryllium fluoride by using as little as 20% excess of the theoretical ammonium bifluoride shown in reaction #3 above. While the carrying out of the new process produces the desired results by the employment of as little as the stated 20% excess of ammonium bifluoride which is theoretically required, it is found preferable to use an excess of ammonium bifluoride in the range of 25% to 40% for the production of high purity beryllium fluoride as compared to the 100% excess required by the heretofore used method.

According to the present improved process using the lesser excess of ammonium bifluoride, ammonium beryllium fluoride is not formed exclusively but rather there is formed by combining the starting ingredients with the selected excess of ammonium bifluoride, an aqueous slurry containing beryllium fluoride, ammonia, and an amount of ammonium beryllium fluoride based on the quantity of excess ammonium bifluoride used.

The procedure followed consists in reacting beryllium hydroxide and ammonium bifluoride by blending the proportionate amounts of the selected ingredients, such as either anhydrous ammonium bifluoride crystals, or aqueous solution of both ammonium fluoride and hydrofluoric acid; or ammonium fluoride crystals and anhydrous hydrofluoric acid; or aqueous solutions of ammonia and hydrofluoric acid; or ammonium fluoride crystals and aqueous hydrofluoric acid; with beryllium hydroxide filter cake containing about 50% free water.

When ammonium bifluoride is selected for reaction with the water-containing beryllium hydroxide filter cake, a thin slurry is formed which is partially dehydrated and converted to flake form by means of a steel or cast iron drum drier operated at about 100 p.s.i. steam pressure.

The chemical compound ammonium bifluoride, as identified by the hereinafter set forth formulae, is formed in the mixture when following the procedure of combining with the beryllium hydroxide filter cake, either the ammonium fluoride-hydrofluoric acid aqueous solution, or the ammonium fluoride-anhydrous hydrofluoric acid mixture, or the aqueous hydrofluoric acid-ammonia solution, or the ammonium fluoride-hydrofluoric acid mixture, in accordance with the hereinafter set forth examples. The slurry formed in following these procedures is then partially dehydrated as above described.

The aqueous slurry can also be partially dehydrated to free flowing crystals in comercially available equipment such as a vacuum rotary drier or a jacketed pan drier.

It has been found possible to convert the slurry (using 1.25 to 1.40 mols of $NH_4HF_2$ per one (1) mol beryllium hydroxide, $Be(OH)_2$) to quasi-dry solids which can be used as feed material to a graphite lined furnace and by this procedure thermally decompose this beryllium fluoride complex into anhydrous, fused beryllium fluoride.

It has been determined that, actually, the chemical reaction wherein the 1.25 to 1.40 mols of ammonium bifluoride per one (1) mol beryllium hydroxide are blended together does not go to completion until it is heated in the graphite lined furnace that also serves to thermally decompose this mixture. Therefore, the furnace serves the dual function of completing the chemical reaction and thermally decomposing the resulting mixture.

Beryllium fluoride prepared with no excess of ammonium bifluoride as shown in Equation 3, forms a syrupy mass rather than crystals upon evaporation and experience has shown that good agitation and sufficient ammonium beryllium fluoride crystal nuclei are required to keep the dried product from forming a sticky mass. While the exact mechanism involved in the reaction is not fully understood, it is believed that since ammonium beryllium fluoride is more insoluble in water than is beryllium fluoride, it will crystallize first out of solution. As the slurry is further evaporated it is likely that the beryllium fluoride keeps depositing onto each ammonium beryllium fluoride crystal nucleus until all of the water is evaporated. In the process thus far set forth, it is preferred to purify the beryllium hydroxide prior to converting it into the fluoride rather than to purify the beryllium fluoride solution prior to evaporation as is done in the described, heretofore used ammonium beryllium fluoride process.

A second method according to the present invention involves the employment of calcined beryllium oxide. It has been found that, if desired, a semi-dried beryllium fluoride compound with 25 to 40% excess ammonium bifluoride can be prepared by reacting the calcined beryllium oxide directly with anhydrous ammonium bifluoride according to the following chemical equation:

(4) $BeO + NH_4HF_2 \rightarrow BeF_2 + NH_3 + H_2O$

This reaction, however, is much more exothermic than is the one in which beryllium hydroxide filter cake is used because it does not have the cushioning effect of the excess water obtained in the filter cake and the addition of either beryllium oxide to ammonium bifluoride or the addition of ammonium bifluoride to beryllium oxide must be carefully controlled to avoid serious loss of the beryllium content by entrainment with the escaping steam.

Both the reaction of calcined beryllium oxide with ammonium bifluoride, as above set forth with reference to Equation 4, and the reaction of beryllium hydroxide filter cake with ammonium bifluoride as set forth hereinbefore with reference to Equation 3, have been successfully carried out, production quantities of 25–40% excess ammonium bifluoride being used in each case.

The beryllium oxide reaction involves a calcination operation following the beryllium hydroxide filtering, the hydroxide being calcined at a temperature of 600° C. to 1200° C., whereas the beryllium hydroxide reaction eliminates the calcining step but replaces it with a drying operation such as by the use of a drum drier, as hereinbefore set forth.

Whereas the composition has to be carefully adjusted to the stoichiometric proportions for the crystallization of ammonium beryllium fluoride in accordance with the heretofore employed procedure, previously described, experience has shown that the actual composition is not nearly so critical in the newer procedure here diclosed, so long as the minimum requirement of 20% excess ammonium bifluoride is met. In the presently disclosed methods, the excess of ammonium bifluoride can vary up to 100% and still be applicable to the disclosed methods or procedures.

Following are examples of the present improved process based upon the use of the beryllium hydroxide filter cake and illustrating different excess percentages of the ammonium bifluoride employed:

EXAMPLE 1

*(Using approximately 20% excess ammonium bifluoride)*

An amount of beryllium hydroxide filter cake weighing 670 pounds containing a calculated 190 pounds of BeO was blended with 520 pounds (19.8% excess fluorine) of anhydrous ammonium bifluoride with agitation in a rubber lined tank. The resulting slurry contained 5.7% Be and 29.2% F and was dried by means of a steel drum drier 32 inches in diameter by 72 inches in length heated with 100 p.s.i. steam pressure to yield 580 pounds of flakes containing 11.9% Be and 60.0% F. These flakes were fed in a continuous manner over a period of 7½ hours into an induction heated graphite furnace crucible 12 inches I.D. x 72 inches long, maintained at a temperature of 1050–1100° C. to yield a total weight of 350 pounds of glassy, fused anhydrous beryllium fluoride. The dried product from the drum drier was slightly tacky and more difficult to scrape off the heated roll compared to the product obtained in examples using 30% excess fluorine in the mix.

EXAMPLE 2

*(Using approximately 30–35% excess ammonium bifluoride)*

An amount of beryllium hydroxide filter cake weighing 655 pounds containing a caluculated 190 pounds of BeO, was blended with 570 pounds of anhydrous ammonium bifluoride with agitation in rubber lined tank. The resulting slurry contained 5.6% Be and 31.0% B, and was dried by means of a steel drum drier as described in Example 1 to yield 610 pounds of flakes containing 11.2% Be and 62.0% F. These flakes were fed in a continuous manner over a period of 8 hours into an induction heated graphite furnace crucible 12 inches I.D. x 72 inches long, maintained at a temperature of 1050–1100° C. to yield 335 pounds of glassy, fused anhydrous beryllium fluoride. In this example the excess fluorine in the blended slurry mix approximates 30.7%.

EXAMPLE 3

*(Using approximately 65% excess ammonium bifluoride)*

An amount of beryllium hydroxide filter cake weighing 660 pounds containing a calculated 190 pounds of BeO was blended with 710 pounds of anhydrous ammonium bifluoride (64% excess fluorine) with agitation in a rubber lined tank. The resulting slurry contained 5.0% Be and 34.7% F, which produced flake material when dried on the steam heated drum drier roll. A total weight of 355 pounds of glassy, fused anhydrous beryllium fluoride was collected from the induction heated graphite furnace.

EXAMPLE 4

*(Using approximately 75% excess ammonium bifluoride)*

An amount of beryllium hydroxide filter cake weighing 660 pounds containing a calculated 190 pounds of BeO was blended with 760 pounds of anhydrous ammonium bifluoride (75% excess fluorine) with agitation in a rubber lined tank. The resulting slurry contained 4.8% Be and 35.8% F, which produced flake material when dried on the steam heated drum drier roll. A total weight of 350 pounds of glassy, fused anhydrous beryllium fluoride was collected from the induction heated graphite furnace.

EXAMPLE 5

*(Using approximately 25% excess ammonium bifluoride)*

An amount of beryllium hydroxide filter cake weighing 670 pounds containing a calculated 190 pounds of BeO was blended with 545 pounds of anhydrous ammonium bifluoride with agitation in a rubber lined tank. The resultant slurry contained 5.62% Be and 29.8% F. This mixture yielded after drying and treatment in a graphite furnace 350 pounds total weight of end product in the form of glassy, fused anhydrous beryllium fluoride.

EXAMPLE 6

*(Using approximately 40% excess ammonium bifluoride)*

An amount of beryllium hydroxide filter cake weighing 670 pounds containing a calculated 190 pounds of BeO was blended with 610 pounds of anhydrous ammonium bifluoride with agitation in rubber lined tank. The resultant slurry contained 5.35% Be and 31.7% F. This mixture yielded after drying and treatment in a graphite furnace 350 total weight of end product in the form of glassy, fused anhydrous beryllium fluoride.

In carrying out the invention wherein the fluoride slurry having an excess of ammonium bifluoride is evaporated, or dewatered, the use of conventional steel driers is made possible without contaminating the end product by corrosion of the metal by maintaining the pH of the slurry on the basic side.

In the reaction of Be(OH)$_2$ filter cake with 30 to 35% excess ammonium bifluoride, as in Example 2, the reacted slurry automatically has a pH of about 7.2, whereas other fluoride slurries such as those prepared for beryllium fluoride leach liquors, in accordance with an example hereinafter set forth, or those slurries prepared with different excesses of ammonium bifluoride, will have to be adjusted to a pH value above 7.0. This is preferably accomplished by the addition of ammonia.

Examples of the present invention using calcined BeO are as follows:

EXAMPLE 7

Three hundreds pounds of anhydrous ammonium bifluoride was charged into a rubber blender 6 feet long x 30 inches high and with the bottom rounded at a 15 inch radius. One hundred pounds of calcined BeO was added with agitation over period of 30 minutes, then the mixture was agitated an additional 30 minutes. The product weighed 350 pounds, and resembled slightly damp table salt. It contained 10.4% Be and 57.2% F. These cystals were fed in a continuous manner into an induction heated graphite furnace crucible maintained at a temperature of 1050–1100° C. to yield 187 pounds of glassy, fused anhydrous beryllium fluoride.

EXAMPLE 8

The same ingredients as those used in Example 7 were used, except that the 100 pounds of BeO was charged into the mixer and the 300 pounds of ammonium bifluoride was added gradually to the oxide over a period of 30 minutes. The amount and type of product obtained were identical.

The foregoing Examples 7 and 8 all contain 30.7% excess fluorine in the blended slurry mix.

In place of using beryllium hydroxide or beryllium oxide as the starting material for preparing the beryllium fluoride compound, an alternative method is to utilize the beryllium fluoride liquors obtained from leaching the slag from the reduction of beryllium fluoride with magnesium. This slag is composed principally of beryllium fluoride, beryllium metal and magnesium fluoride. The beryllium contained therein is extracted by a leaching with water and dilute hydrofluoric acid, the solution being designated as spent salt leach liquors. The only requirement connected with this alternative method is that the fluoride content of the resulting fluoride slurry must be adjusted to contain a minimum of 20% excess fluorine as hereinbefore stated, and the pH must be adjusted to a minimum of 7.0.

Following is an example of the above alternative method:

EXAMPLE 9

One thousand gallons of combined spent salt leach liquors containing 67 pounds of beryllium (Be) was evaporated to 200 gallons, the impurities removed therefrom by treating with lead dioxide and hydrogen sulfide and filtering, and then evaporated further to 125 gallons. Two hundred pounds of ammonium bifluoride crystals were added to the concentrate, and the pH was adjusted to 7.2 with 28% aqueous ammonia. The concentrated slurry contained 5.4% Be and 30.2% fluorine, and was dewatered by means of a drum drier heated internally at 100 p.s.i. steam pressure to yield 615 pounds of flakes which assayed 10.9% Be and 61.1% F. The flakes were fed in a continuous manner into an induction heated graphite crucible maintained 1000–1100° C. to yield 345 pounds of glassy, fused beryllium fluoride.

Production of high purity beryllium fluoride may also be effected in accordance with the objects of the present invention by a procedure in which the ammonium bifluoride is replaced with anhydrous ammonia and anhydrous hydrogen fluoride (hydrofluoric acid), as illustrated by the following examples:

EXAMPLE 10

An amount of beryllium hydroxide filter cake weighing 655 pounds containing 190 pounds of BeO was reacted with 400 pounds of anhydrous HF in an agitated, rubber-lined tank. A total of 170 pounds of anhydrous ammonia gas was bubbled into the above reaction product with continuous agitation throughout. The resulting slurry had a pH value of 7.4, and contained 5.6% Be and 31.0% F. The dewatered product from the drum drier operation was in the form of flakes. A total weight of 355 pounds of glassy, fused anhydrous beryllium fluoride was collected from the induction heated graphite furnace.

EXAMPLE 11

An amount of beryllium hydroxide filter cake weighing 670 pounds containing a calculated 190 pounds of BeO was blended with 287 pounds of 70% hydrofluoric acid and 104 gallons of aqueous solution containing 3.55 pounds per gallon of ammonium fluoride with agitation in a rubber lined tank. Solution was purified by treatment with lead dioxide and hydrogen sulfide, and filtered. After evaporating 23 gallons of water, the resulting slurry contained 4.5% Be and 31.0% F, and was dried by means of a steel drum drier as described in Example 1 to yield 610 pounds of flakes containing 11.2% Be and 62.0% F. These flakes were fed in a continuous manner over a period of 8 hours into an induction heated graphite furnace crucible maintained at a temperature of 1050–1100° C. to yield 355 pounds of glassy, fused anhydrous beryllium fluoride. In this example, the excess fluorine in the blended slurry mix approximates 30.7%.

EXAMPLE 12

An amount of beryllium hydroxide filter cake weighing 670 pounds containing a calculated 190 pounds of BeO was blended with 545 pounds of 70% hydrofluoric acid and 652 pounds of 25% aqueous ammonia with agitation in a rubber lined tank. Solution was purified by treatment with lead dioxide and hydrogen sulfide, and filtered. A total 650 pounds of water (78 gallons) was evaporated from the reaction solution and the resultant slurry which contained 5.62% Be and 29.8% F was dried by means of a drum drier. This mixture yielded, after drying and treatment in a graphite furnace, 350 pounds total weight of end product in the form of glassy, fused anhydrous beryllium fluoride.

EXAMPLE 13

An amount of beryllium hydroxide filter cake weighing 670 pounds containing a calculated 190 pounds of BeO was blended with 612 pounds of 70% hydrofluoric acid and 728 pounds of 25% aqueous ammonia with agitation in a rubber lined tank. Solution was purified by treatment with lead dioxide and hydrogen sulfide, filtered, and a total of 725 pounds of water was evaporated. The resultant slurry contained 5.35% Be and 31.7% F. This mixture yielded, after drying and treatment in a graphite furnace 350 pounds total weight of end product in the form of glassy, fused anhydrous beryllium fluoride.

The chemical compound ammonium bifluoride can be identified by the following chemical formulae:

(a) $NH_4HF_2$
(b) $NH_4F \cdot HF$
(c) $NH_3 \cdot HF$

An example of the formula (a) as indicated above is the use of anhydrous ammonium bifluoride crystals. An example of formula (b) is the use of aqueous solutions of both ammonium fluoride and hydrofluoric acid in equimolar proportions, or the use of ammonium flouride crystals and anhydrous hydrofluoric acid, as well as the use of ammonium fluoride crystals and aqueous hydrofluoric acid. An example of formula (c) is the use of aqueous solutions of ammonia and hydrofluoric acid in the mol ratio of one mol of ammonia per two mols of hydrofluoric acid, aqueous ammonia and anhydrous hydrofluoric acid, or both in an anhydrous state. Wherever aqueous solutions of ammonium bifluoride or its components are used, the water contained therein must be evaporated prior to the dewatering step with the drum drier.

As hereinbefore se forth, in a number of the examples, the dewatered product from the drum drier is in the form of flakes and such flakes exhibit various physical characteristics, one of which, for example, is coarseness and whiteness.

It will be seen from the foregoing that there is disclosed in the present application a new and novel process for the production of high purity beryllium fluoride, which process reduces the number of manipulative steps heretofore required and also the process in the several variations thereof reduces the amount of excess fluorine consumed in the method heretofore used for the commercial production of high purity or nuclear grade beryllium fluoride.

We claim:

1. A method of producing high purity beryllium fluoride which consists in continuously reacting beryllium hydroxide filter cake with hydrofluoric acid and an aqueous solution of ammonium fluoride, using an amount of hydrofluoric acid and ammonium fluoride to produce in the mixture ammonium bifluoride in an amount of from 25 to 40% in excess of the theoretical amount required for preparing beryllium fluoride, purifying by treatment with lead dioxide and hydrogen sulfide, continuously filtering and dewatering the filtrate by evaporation to produce a slurry containing a beryllium fluoride complex in the form of quasi-dry, free flowing coarse white particles, and then continuously feeding said complex particles into a graphite lined furnace having a temperature of from 1050° to 1100° C. to thermally decompose the complex to beryllium fluoride and continuously recovering said purified beryllium fluoride.

2. A method of producing high purity beryllium fluoride which consists in continuously reacting beryllium hydroxide filter cake with hydrofluoric acid and 25% aqueous ammonia, using an amount of the hydrofluoric acid and the aqueous ammonia such as to produce in the mixture ammonium bifluoride in an amount of from 25 to 40% in excess of the theoretical amount required for preparing berylium fluoride, purifying by treatment with lead dioxide and hydrogen sulfide, continuously filtering and dewatering the mixture by evaporation to produce a slurry containing a beryllium fluoride complex in the form of quasi-dry, free flowing coarse white particles, and then continuously feeding said complex particles into a graphite lined furnace having a temperature of from 1050° to 1100° C. to thermally decompose the complex to beryllium fluoride and continuously recovering said purified beryllium fluoride.

3. A method of producing high purity beryllium fluoride which consists in continuously reacting beryllium hydroxide filter cake with hydrofluoric acid and 25% aqueous ammonia, using an amount of the hydrofluoric acid and the aqueous ammonia such as to produce in the mixture ammonium bifluoride in an amount of from 25 to 40% in excess of the theoretical amount required for preparing berylium fluoride, purifying by treatment with lead dioxide and hydrogen sulfide, continuously filtering and dewatering the filtrate by evaporation to produce a slurry containing a beryllium fluoride complex in the form of quasi-dry, free flowing coarse white particles, and then continuously feeding said complex particles into a graphite lined furnace having a temperature of from 1050° to 1100° C. to thermally decompose the complex to beryllium fluoride and continuously recovering said purified beryllium fluoride.

4. A method according to claim 2, wherein the hydrofluoric acid is of 70% concentration.

References Cited by the Examiner

UNITED STATES PATENTS

| | | | |
|---|---|---|---|
| 2,173,290 | 9/39 | Adamoli | 23—88 |
| 2,233,465 | 3/41 | Adamoli | 23—88 |
| 2,660,515 | 11/53 | Schwenzfeier et al. | 23—88 |
| 2,804,372 | 8/57 | Morana | 23—88 |
| 2,819,149 | 1/58 | Schwenzfeier | 23—88 |

FOREIGN PATENTS 1,176,409    4/59    France.

MAURICE A. BRINDISI, *Primary Examiner.*